United States Patent
Baumann

(10) Patent No.: US 10,994,459 B2
(45) Date of Patent: May 4, 2021

(54) INJECTION MOLD FOR MANUFACTURING AN INJECTION-MOLDED COMPONENT AND METHOD FOR MANUFACTURING AN INJECTION-MOLDED COMPONENT

(71) Applicant: Gerresheimer Regensburg GmbH, Regensburg (DE)

(72) Inventor: Manfred Baumann, Schirmitz (DE)

(73) Assignee: Gerresheimer Regensburg GmbH, Regensburg (DE)

( * ) Notice: Subject to any disclaimer, the term of this patent is extended or adjusted under 35 U.S.C. 154(b) by 144 days.

(21) Appl. No.: 16/028,101

(22) Filed: Jul. 5, 2018

(65) Prior Publication Data
US 2019/0016030 A1    Jan. 17, 2019

(30) Foreign Application Priority Data
Jul. 13, 2017    (DE) .................... 102017115729.8

(51) Int. Cl.
| | |
|---|---|
| *B29C 45/26* | (2006.01) |
| *B29C 45/36* | (2006.01) |
| *B29C 45/40* | (2006.01) |
| *B29C 33/38* | (2006.01) |

(52) U.S. Cl.
CPC ........ *B29C 45/261* (2013.01); *B29C 33/3842* (2013.01); *B29C 45/2628* (2013.01); *B29C 45/36* (2013.01); *B29C 45/40* (2013.01)

(58) Field of Classification Search
CPC ... B29C 45/261; B29C 45/2628; B29C 45/36; B29C 45/40; B29C 33/3842; B29C 67/241; B28B 1/24; B28B 7/342
See application file for complete search history.

(56) References Cited

U.S. PATENT DOCUMENTS

| | | | | |
|---|---|---|---|---|
| 2,197,465 | A | * 4/1940 | Brunetti | ............ B29C 45/14549 |
| | | | | 264/229 |
| 2,438,348 | A | * 3/1948 | Morin | ............... B29C 45/14549 |
| | | | | 264/251 |
| 3,385,553 | A | * 5/1968 | Braun | ................... B29C 45/261 |
| | | | | 249/142 |

(Continued)

FOREIGN PATENT DOCUMENTS

| | | |
|---|---|---|
| CN | 101242943 | 8/2008 |
| CN | 102794842 | 11/2012 |

(Continued)

*Primary Examiner* — Xiao S Zhao
*Assistant Examiner* — Emmanuel S Luk
(74) *Attorney, Agent, or Firm* — Simpson & Simpson, PLLC

(57) ABSTRACT

The invention relates to an injection mold for manufacturing an injection-molded component from plastic material. The injection mold including an outer first half-mold and an outer second half-mold, which, when joined, define an empty space, which determines an outer contour of the injection-molded component, and a core, which is located in the empty space and determines an inner contour of the injection-molded component. A wire passes through the core and the joined outer first half-mold and outer second half-mold, and plural pairs of clamping jaws fix the wire in its position. A method for manufacturing an injection-molded component is also disclosed.

5 Claims, 3 Drawing Sheets

(56) References Cited

U.S. PATENT DOCUMENTS

| | | | | |
|---|---|---|---|---|
| 3,976,740 | A * | 8/1976 | Klingler | B29C 45/36 |
| | | | | 264/229 |
| 4,877,394 | A * | 10/1989 | McFarlane | B29C 45/14598 |
| | | | | 425/567 |
| 4,900,491 | A * | 2/1990 | Odink | B29C 43/10 |
| | | | | 264/109 |
| 5,034,170 | A * | 7/1991 | Briggs, Jr. | B29C 45/261 |
| | | | | 264/1.25 |
| 6,284,160 | B1 * | 9/2001 | Kiernicki | B29C 45/261 |
| | | | | 264/1.25 |
| 6,317,102 | B1 * | 11/2001 | Stambeck | H01Q 9/30 |
| | | | | 343/900 |
| 6,583,563 | B1 * | 6/2003 | Venkataramani | H01J 9/247 |
| | | | | 313/623 |
| 6,887,417 | B1 * | 5/2005 | Gawreluk | A61M 25/0009 |
| | | | | 264/328.1 |
| 7,682,547 | B2 * | 3/2010 | Balaschak | B28B 1/24 |
| | | | | 264/317 |
| 2003/0000315 | A1 * | 1/2003 | Leys | B29C 66/73365 |
| | | | | 73/861.57 |
| 2003/0028154 | A1 | 2/2003 | Ross | |
| 2003/0116892 | A1 * | 6/2003 | Horibe | B28B 1/265 |
| | | | | 264/635 |
| 2004/0005122 | A1 * | 1/2004 | Ishii | B29C 45/261 |
| | | | | 385/78 |
| 2004/0113557 | A1 * | 6/2004 | Scott | B28B 1/24 |
| | | | | 313/634 |
| 2005/0033237 | A1 * | 2/2005 | Fentress | A61M 25/0014 |
| | | | | 604/165.03 |
| 2005/0253301 | A1 * | 11/2005 | Kraenzle | B05C 17/00516 |
| | | | | 264/328.1 |
| 2010/0243764 | A1 * | 9/2010 | Okesaku | B28B 7/18 |
| | | | | 239/589 |
| 2013/0220571 | A1 * | 8/2013 | Mueller | B22C 7/06 |
| | | | | 164/44 |
| 2014/0070453 | A1 * | 3/2014 | Dietl | B29C 45/14065 |
| | | | | 264/275 |
| 2015/0051587 | A1 * | 2/2015 | Rolsted | A61M 25/0017 |
| | | | | 604/538 |
| 2015/0123311 | A1 * | 5/2015 | Zahn | B29C 45/14008 |
| | | | | 264/275 |
| 2017/0282464 | A1 * | 10/2017 | Stadler | B29C 48/13 |
| 2019/0255282 | A1 * | 8/2019 | Inukai | B29C 45/14598 |
| 2019/0299507 | A1 * | 10/2019 | Vogl | B29C 45/33 |

FOREIGN PATENT DOCUMENTS

| | | | |
|---|---|---|---|
| CN | 105555339 | 5/2016 | |
| GB | 819225 A * | 9/1959 | A61M 25/0043 |
| JP | S62225316 A | 10/1987 | |
| TW | 201223659 | 6/2012 | |
| WO | WO2008139982 | 8/2010 | |
| WO | WO2015/151936 | 10/2015 | |

* cited by examiner

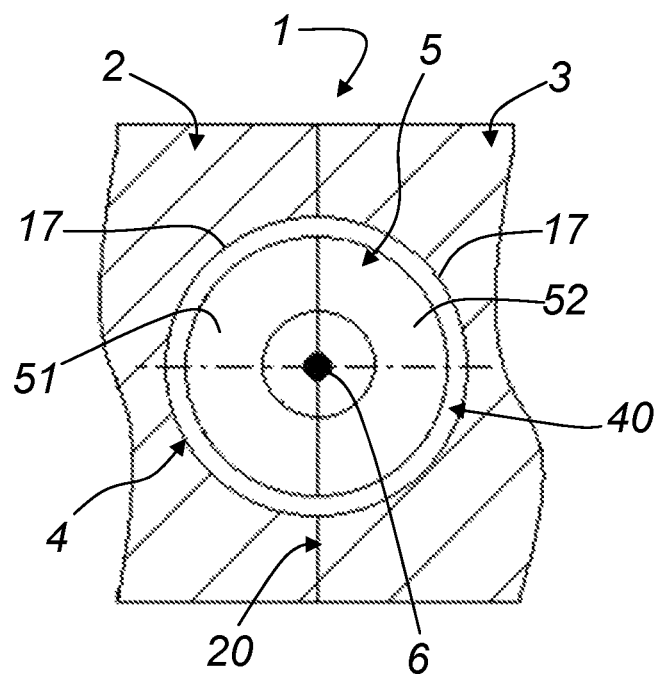
Fig. 5
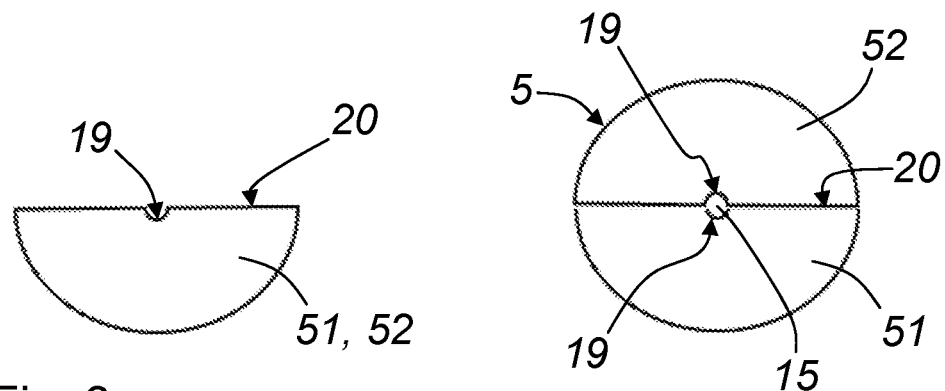
Fig. 6
Fig. 7

INJECTION MOLD FOR MANUFACTURING AN INJECTION-MOLDED COMPONENT AND METHOD FOR MANUFACTURING AN INJECTION-MOLDED COMPONENT

CROSS-REFERENCE TO RELATED APPLICATIONS

The present application is filed under 35 U.S.C. §§ 111(a) and 119 and claims the benefit of German Patent Application No. DE 10 2017 115 729.8, filed on Jul. 13, 2017, which application is incorporated herein by reference in its entirety.

FIELD

The invention relates to an injection mold for manufacturing an injection-molded component from plastic material. The injection mold includes an outer first half-mold and an outer second half-mold, which, when joined, define an empty space, which determines a better contour of the injection-molded component. A core is located in the empty space and thereby defines an inner contour of the injection-molded component. The invention further relates to a method for manufacturing an injection-molded component.

BACKGROUND

In prior art methods for manufacturing injection-molded components which have a nozzle the core of an injection mold is shaped to exhibit a protrusion of bulk material. During the injection molding, the core of bulk material is fixed/centered for stabilization during the injection molding at the side of the nozzle/expeller, in order to form the bore in the injection-molded component. Herein the protrusion for shaping the bore in the injection-molded component breaks after a small number of injections. This breaking occurs due to the increased alternating stresses during the injection molding and thus does not lead to a stable production process. Furthermore this results in increased costs, caused by the exchange of the entire core. Furthermore, with prior art cores it is impossible to form nozzle diameters below 0.5 mm in injection-molded components.

US 2003/0028154 A1 discloses an injection mold for manufacturing an injection-molded component from plastic material, comprising an outer top first half-mold and an outer bottom second half-mold, which, when joined, define an empty space, which determines an outer contour of the injection-molded component, and a core located in the empty space determining an inner contour of the injection-molded component. Within a cylindrical hollow space for the needle part of the injection-molded component to be manufactured a spike is located, the outer diameter of which determines the inner diameter of the needle part. The spike is positioned along the centerline of the needle part. The end of the spike is tapered, in order to precisely fit into the core.

US 2004/0005122 A1 discloses an injection mold for manufacturing a ferrule partially made from plastic material. The injection mold comprises an outer top first half-mold and an outer second half-mold, which when joined define an empty space which determines an outer contour of the injection-molded component, and a core located in the empty space and determining an inner contour of the injection-molded component. A core pin is located in an axially centered manner in a second hollow space for forming the connection bore of a base section, axially distant form a first hollow space at an axial end. The core pin has a free end, which tightly fits into a bore of the main body of the clamp.

JP S62-225316 A discloses an injection mold for manufacturing an injection-molded component from plastic material, comprising an outer first half-mold and an outer second half-mold, which when joined define an empty space determining an outer contour of the injection-molded component. An injector fills the empty space with an injection-molding material, wherein the injector has a pin portion, an elastic spiral spring and a wire. The injector is held in place by the elastic force of the spiral spring until the injection-molding material has hardened. When subsequently the two half-forms are separated, a bar is moved and a cylinder is driven, which is connected to the end of the wire of the injector, so that the pin portion of the injector is separated from the formed injection-molded component.

SUMMARY

It is an object of the invention to provide an injection mold allowing the manufacture of injection-molded components from plastic material with a nozzle diameter below 1 mm and guaranteeing a reliable and continuous operation of the manufacturing process of the injection-molded components.

This object is achieved by an injection mold for manufacturing an injection-molded component from plastic material, the injection mold having an outer first half-mold and an outer second half-mold, which when joined define an empty space. The empty space defines an outer contour of the injection-molded component. A core located in the empty space defines an inner contour of the injection-molded component. The injection mold furthermore comprises a wire passing through the core and the joined outer first half-mold and outer second half-mold. Plural clamping jaws of the injection mold fix the wire in its position.

A further object of the invention is to provide a method for manufacturing an injection-molded component from plastic material which can be operated continuously and without interruption of the manufacturing process of the injection-molded components, and which allows manufacturing injection-molded components with a diameter of a nozzle below 1 mm.

This object is achieved by a method comprising the following steps:

inserting a core with a bore-hole along a centerline of the core in an empty space of a joined outer first half-mold and outer second half-mold;

pushing a wire into the bore-hole of the core in such a way that the wire bridges a contour space between the core and the joined outer first half-mold and outer second half-mold along the direction of the centerline and protrudes from the injection mold;

clamping and fixing in position the wire in the vicinity of a first end of the injection mold and in the vicinity of a second end of the injection mold;

injecting a plastic material into the contour space, so that the injection-molded component with an opening having the diameter and cross-sectional shape of the wire can be formed; and, pulling, for freeing the injection-molded component from the injection mold, the core along the wire out of the injection-molded component located in the injection mold.

The injection mold for manufacturing an injection-molded component from plastic material is characterized by an outer first half-mold and an outer second half-mold, which, when joined, define an empty space. The empty space thus determines an outer contour of the injection-molded component. Furthermore, a core is inserted into the empty space, which determines an inner contour of the injection-molded component. According to the invention a wire passes through the core and the joined outer first half-mold and outer second half-mold. The wire is fixed in its position by plural pairs of clamping jaws. By fixing the wire a deflection of the wire during the injection molding is avoided. This has the advantage that the opening, or nozzle, in the injection-molded component can be formed with the required diameter below 1 mm during the injection molding of the injection-molded component.

According to the invention the core has a bore-hole along a centerline for guiding the wire. Prior to each injection molding process the wire is passed through the bore-hole in the core and, via the bore-hole in the joined outer first half-mold and outer second half-mold, reaches the outside and can be fixed or positioned in a corresponding manner for the injection molding process. According to a further embodiment of the invention the core may comprise a first half and a second half. Thereunto a semi-circular groove is formed in each half. In the joined state of the two halves of the core a bore-hole results, in which the wire can be guided in preparation of an injection molding process.

By means of the pairs of clamping jaws the wire is clamped and positioned during the injection process. By the wire clamped and positioned in this way the reproducible forming of the opening with the required diameter in the injection-molded component during manufacture is ensured. For forming the opening or nozzle of the injection-molded component the wire is arranged fixed in position in a contour space between the core and the joined outer first half-mold and outer second half-mold.

According to an advantageous embodiment of the invention the pairs of clamping jaws are arranged on collets. In the vicinity of a first end of the injection mold at least two pairs of clamping jaws are provided, the clamping forces of which act perpendicularly on the wire. At a second end of the injection mold at least one pair of clamping jaws is provided, the clamping force of which acts perpendicularly on the wire, so that the clamped wire can be pushed into the injection mold and pulled out of the injection mold. To this end the clamped pair of clamping jaws is moveable in a direction parallel to the wire.

The method according to the invention for manufacturing an injection-molded component is characterized in that first a core with a bore-hole along a centerline of the core is inserted in an empty space of a joined outer first half-mold and outer second half-mold. Next, a wire is pushed into the bore-hole of the core in such a way that the wire bridges a contour space between the core and the joined outer first half-mold and outer second half-mold along the direction of the centerline of the injection mold and protrudes from the injection mold. In the vicinity of a first end of the injection mold and in the vicinity of a second end of the injection mold the wire is clamped and fixed in position by means of corresponding clamping jaws. Then a plastic material is injected into the contour space, so that the injection-molded component with an opening having the diameter and cross-sectional shape of the wire, which has been inserted into the bore-hole or recess of the core, is formed. After the injection molding process the injection-molded component is removed from the injection mold. To this end, the core is pulled out of the injection-molded component located in the injection mold along the wire.

For freeing the injection-molded component from the injection mold a clamping force acting on the wire from plural clamping jaws is released. At least one pair of clamping jaws therein is configured to be moved linearly in the direction of the wire. By this linear movement of the pair of clamping jaws, which still clamps the wire, the wire can be pulled out of the core. The pair of clamping jaws which can move in a direction parallel to the wire preferentially is provided in the vicinity of the second end of the injection mold.

In the context of the method according to the invention it is particularly advantageous that prior to each injection molding process for an injection-molded component a new section of the wire is positioned in the contour space between core and the joined outer first half-mold and outer second half-mold. Thus for each injection for manufacturing an injection-molded component always a new part of the wire, not affected by the pressures acting during the injection molding process, is used.

As already described above, the core, in order to form the diameter of the bore-hole or the opening of the injection-molded component, respectively, is replaced with a running and clamped wire. Thus it is possible to manufacture nozzle diameters up to a size greater or equal to 0.03 mm. Depending on the injection molding process the wire passed through the core is exposed once only to the forces acting during the injection molding process. This has the advantage that it is not affected by continually changing forces. The outer contour and the inner contour of the injection-molded component are in the tool separation. During or prior to the freeing of the injection-molded component from the injection mold the core is moved back and thus releases the injection-molded component. Next the injection-molded component is moved outwards through the opened mold on the wire, and in a subsequent step the wire is removed from the nozzle body. This for instance can be done by cutting or pulling out.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 5 is a partial front view of the injection mold, with the core inserted into the empty space between the joined first and second half-molds.

FIG. 6 is a schematic front view of a first half of the core used in the present invention; and, FIG. 7 is a schematic front view with the first half and the second half of the core joined, resulting in the through-bore.

It is obvious for a skilled person that the embodiments of the core, of the bore-hole in the core, and of the outer first half-mold and the outer second half-mold shown in the figures are not to be considered a limitation of the invention. The illustrations only serve the description and better understanding of the invention.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

Figure 1:
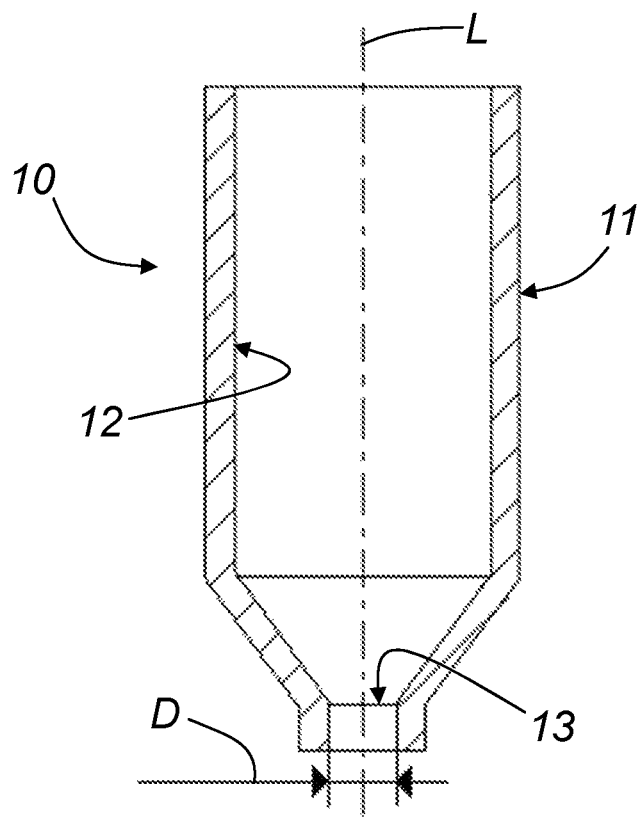
FIG. 1 is a sectional view of a possible embodiment of an injection-molded component, having the opening or nozzle at one end.

Adverting now to the figures, FIG. 1 shows a schematic sectional view of injection-molded component 10, manufactured with the injection mold according to the invention and with the method according to the invention, respectively. Injection-molded component 10 is defined by outer contour 11 and inner contour 12. Injection-molded component 10 also has opening 13. Usually, opening 13 of injection-molded component 10 has a semicircular cross-section. Opening 13, or nozzle 13, produced with the injection mold according to the invention or with the method according to the invention using injection mold 1 (see FIG. 3) according to the invention, has a diameter D in the range between 0.03 mm and 1 mm. Preferably, injection-molded component 10 has a cylindrical shape extending along centerline L, with opening 13 of injection-molded component 10 located on centerline L.

Figure 2:
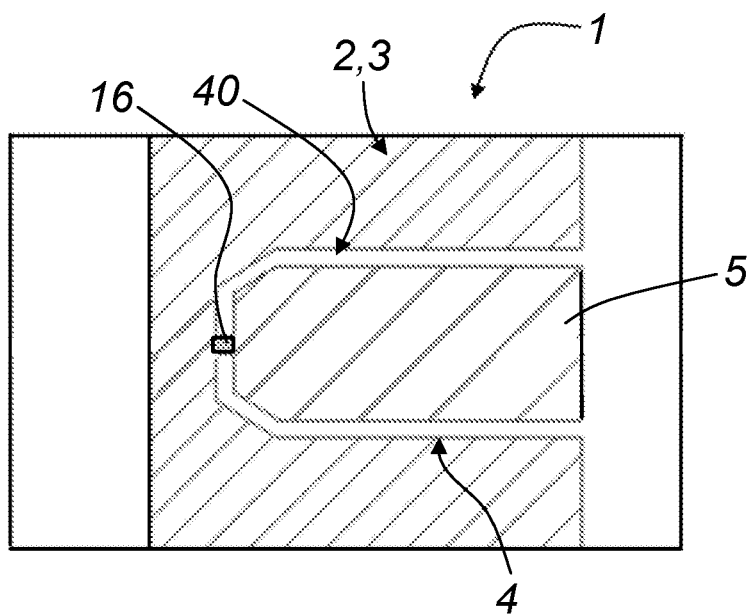
FIG. 2 is a schematic sectional view of a prior art injection mold for manufacturing a nozzle in an injection-molded component.

FIG. 2 is a schematic sectional view of prior art injection mold 1. Injection mold 1 comprises outer first half-mold 2 and outer second half-mold 3. The sectional view illustrated in FIG. 2 only shows one of the half-molds. Outer first half-mold 2 and outer second half-mold 3 define empty space 4, into which core 5 is inserted. Core 5, along with Outer first half-mold 2 and Outer second half-mold 3, define contour space 40, which determines the shape of injection-molded component 10. For forming opening 13 of injection-molded component 10, core 5 is provided with fixed protrusion 16. Fixed protrusion 16 bridges contour space 40 so that opening 13 in injection-molded component 10 is formed during the injection molding process.

Figure 3:
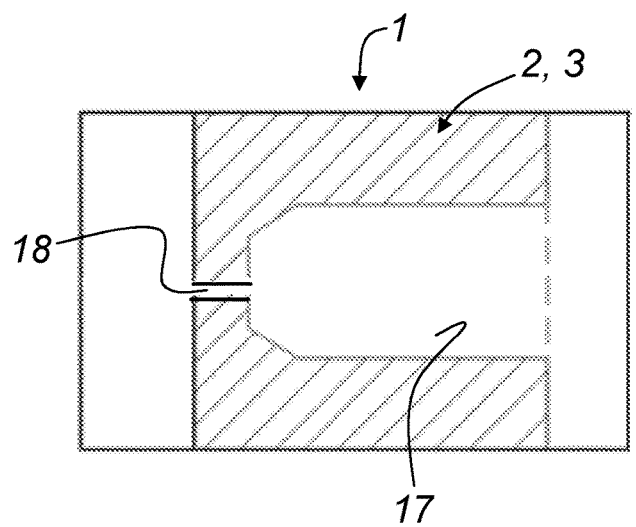
FIG. 3 is a schematic sectional view of an outer half-mold for manufacturing an injection-molded component according to an embodiment of the invention.

FIG. 3 illustrates a section view through outer first half-mold 2 or outer second half-mold 3. Each of the two half-molds 2, 3 has contour 17 corresponding to outer contour 11 of injection-molded component 10. Outer first half-mold 2 and outer second half-mold 3 have a further contour 18 joined to contour 17. In the assembled state, outer first half-mold 2 and outer second half-mold 3 contain a bore-hole, or passage, through which wire 6 (see FIG. 4) can be passed.

Figure 4:
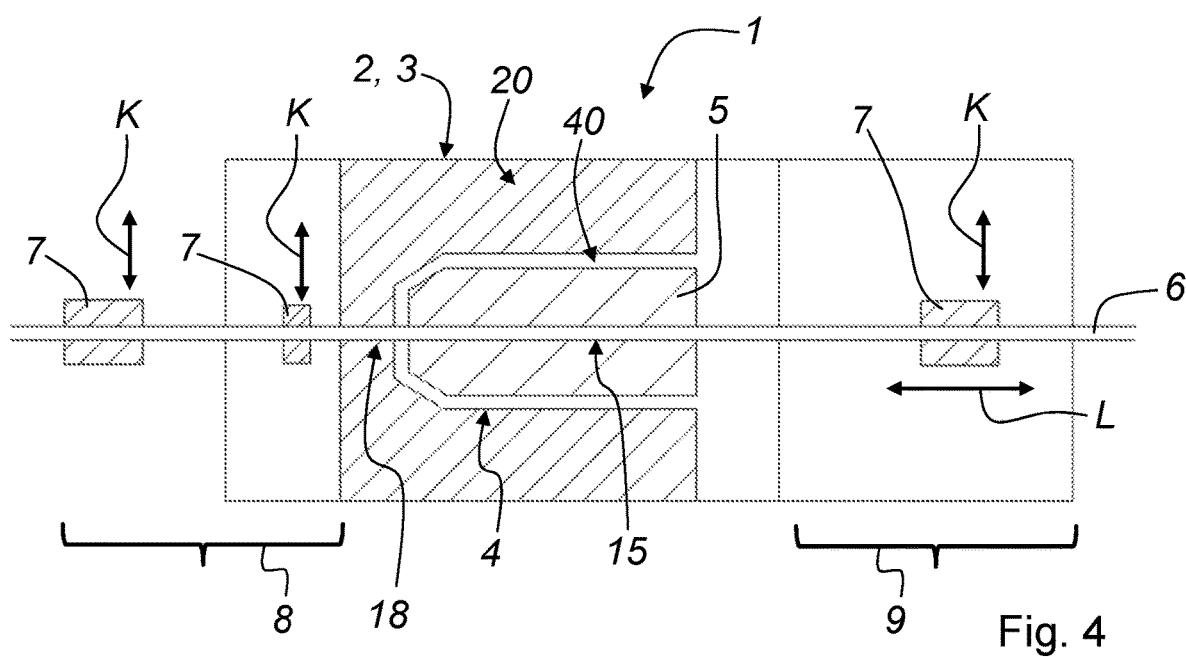
FIG. 4 is a schematic sectional view of an injection mold according to an embodiment of the invention for manufacturing an injection-molded component with a nozzle.

FIG. 4 illustrates a sectional view of injection mold 1 according to the invention along separation plane 20 of outer first half-mold 2 and outer second half-mold 3. Core 5 is inserted in empty space 4 formed by outer first half-mold 2 and outer second half-mold 3. Between core 5 and outer first half-mold 2 and outer second half-mold 3, contour space 40 is formed, which is filled with the plastic material during the injection molding process and thus represents the shape of injection-molded component 10. A wire is passed through bore-hole 15 of core 5 and through contour 18 of outer first half-mold 2 and outer second half-mold 3. Wire 6 bridges contour space 40 between core 5 and outer first half-mold 2 and outer second half-mold 3. Wire 6 serves to form opening 13 in injection-molded component 10. During the injection molding process for manufacturing injection-molded component 10, plural pairs of clamping jaws 7 are provided, which fix and position wire 6 for the injection molding process. In the embodiment shown in FIG. 4, two pairs of clamping jaws 7 are provided at first end 8 of injection mold 1. Each of the pairs of clamping jaws 7 exerts force K perpendicular to wire 6, in order to position wire 6 in a corresponding manner for the injection molding process. At second end 9 of injection mold 1 at least one pair of clamping jaws 7 is provided, which also act to position wire 6 in its position with force K perpendicular to the wire. Furthermore, this pair of clamping jaws 7 are also movable in a centerline direction L parallel to wire 6. By this movement of the pair of clamping jaws 7, wire 6 to can be pulled out of core 5 and out of opening 13 of injection-molded component 10 after completion of the injection molding process. In preparation of the injection molding process wire 6 can be inserted or pushed into core 5 and into outer first half-mold 2 and outer second half-mold 3 with pair of clamping jaws 7 at second end 9. Clamping force K of clamping jaws 7 can be released or increased in the directions indicated in FIG. 4 along the double arrow, as required.

FIG. 5 illustrates a partial frontal view of injection mold 1. Here it is shown that outer first half-mold 2 and outer second half-mold 3 are joined along separation plane 20. As shown in FIG. 5, from the joining of outer first half-mold 2 and outer second half-mold 3, cylindrical empty space 4 results. Core 5 is inserted into cylindrical empty space 4. In this way, contour space 40 results between core 5 and the joined outer first half-mold 2 and outer second half-mold 3, in which injection-molded component 10 is formed. In the center of core 5, wire 6 is located, which is provided to form opening 13 of injection-molded component 10. In the embodiment shown in FIG. 5, core 5 also comprises first half 51 and a second half 52.

FIG. 6 illustrates a frontal view of first half 51 or of second half 52. Semicircular groove 19 is formed in core 5, which, as shown in FIG. 7, in the joined state of first half 51 and second half 52 form bore-hole 15, through which wire 6 (see FIG. 5) can be passed.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS 1 injection mold
2 outer first half-mold
3 outer second half-mold
4 empty space
5 core
6 wire
7 pair of clamping jaws
8 first end
9 second end
10 injection-molded component
11 outer contour
12 inner contour
13 opening
15 bore-hole
16 protrusion
17 contour
18 contour
19 groove
20 separation plane
40 contour space
51 first half
52 second half
D diameter
K clamping force
L centerline

What is claimed is:

1. An injection mold for manufacturing an injection-molded component from a plastic material, the injection mold comprising:
   an outer first half-mold;
   an outer second half-mold, which, when joined with the outer first half-mold, defines a first bore-hole and an empty space which determines an outer contour of the injection-molded component;
   a core located in the empty space, the core determining an inner contour of the injection-molded component and a second bore-hole;
   a wire passing through the second bore-hole and the first bore hole; and,
   plural pairs of clamping jaws for fixing the wire in position for an injection molding process;
   wherein at least one pair of clamping jaws of the plural pairs of clamping jaws is movable in a centerline direction independently and outside from the outer first half-mold and the outer second-half mold to pull the wire into or out of the second bore-hole and the first bore-hole.

2. The injection mold according to claim 1, wherein the second bore-hole is arranged along a centerline of the core and the wire is guided along the centerline.

3. The injection mold according to claim 1, wherein the core comprises a first half and a second half, with a semicircular groove shaped in each half, so that in an assembled state of the two halves the second bore-hole for guiding the wire results.

4. The injection mold according to claim 1, wherein by the wire, clamped and positioned by means of the plural pairs of clamping jaws, an opening is formable in the injection-molded component during the injection process, wherein the wire is fixed in a first position in a contour space between the core and the joined outer first half-mold and outer second half-mold.

5. The injection mold according to claim 4, wherein in the vicinity of a first end of the injection mold at least a first pair of clamping jaws and a second pair of clamping jaws of the plural pairs of clamping jaws are provided, clamping forces of which act perpendicularly on the wire, and wherein at a second end of the injection mold at least a third pair of clamping jaws of the plural pairs of clamping jaws is provided, wherein a clamping force of which acts perpendicularly on the wire and the at least third pair of clamping jaws is movable in the centerline direction, so that the clamped wire is pushable into the injection mold or pullable out of the injection mold.

\* \* \* \* \*